(12) United States Patent
Buehl

(10) Patent No.: US 8,763,095 B2
(45) Date of Patent: Jun. 24, 2014

(54) AUTHORIZATION SHARING

(75) Inventor: Matthias Buehl, Heidelberg (DE)

(73) Assignee: SAP AG, Walldorf (DE)

( * ) Notice: Subject to any disclaimer, the term of this patent is extended or adjusted under 35 U.S.C. 154(b) by 19 days.

(21) Appl. No.: 13/445,617

(22) Filed: Apr. 12, 2012

(65) Prior Publication Data

US 2013/0276066 A1    Oct. 17, 2013

(51) Int. Cl.
  *G06F 17/30* (2006.01)
  *G06F 7/04* (2006.01)
  *H04L 29/06* (2006.01)
  *G06F 15/16* (2006.01)
  *G06F 7/00* (2006.01)

(52) U.S. Cl.
  USPC ............... 726/4; 709/206; 709/207; 707/758

(58) Field of Classification Search
  USPC .................. 726/4; 709/206–207; 707/758
  See application file for complete search history.

(56) References Cited

U.S. PATENT DOCUMENTS

2010/0146063 A1* 6/2010 Lidin et al. ............. 709/206
2012/0221590 A1* 8/2012 Liu ........................ 707/758

OTHER PUBLICATIONS

Singh, Kapil, et al. "On the incoherencies in web browser access control policies." Security and Privacy (SP), 2010 IEEE Symposium on. IEEE, 2010.*
Butt, Ali Raza, et al. "Fine-grain access control for securing shared resources in computational grids." Parallel and Distributed Processing Symposium., Proceedings International, IPDPS 2002, Abstracts and CD-ROM. IEEE, 2002.*
Access Control for Shared Resources; Erik Wilde; Proceedings of the 2005 International Conference on Computational Intelligence for Modelling, Control and Automation, and International Conference on Intelligent Agents, Web Technologies and Internet Commerce (CIMCA-IAWTIC'05), year 2005.*
Microsoft: Accessing resources across domains; Updated: Jan. 21, 2005.*
Microsoft: Accessing resources across forests; Updated: Feb. 21, 2006.*

* cited by examiner

*Primary Examiner* — Evans Desrosiers
(74) *Attorney, Agent, or Firm* — Brake Hughes Bellermann LLP

(57) ABSTRACT

A method relates to access control of shared resources on computer systems that have diverse system policies for access rights to resources. The method includes, on a source computer system with which a target computer system shares a resource, preparing user-authorization data for the shared resource in a flat file format as data tuples, line records or tables. This format makes the user-authorization data usable in computer systems with diverse system policies for access rights to resources. The method further includes authorizing user access to the shared resource on the target computer system based on the user-authorization data prepared in flat file format by the source computer system.

15 Claims, 4 Drawing Sheets

AUTHORIZATION SHARING

BACKGROUND

For security or other reasons (e.g., managing loads), computer systems and networks (hereinafter "computer systems") may limit user access to objects or data, or otherwise control user actions or operations. Users may be authenticated and authorized to access only certain objects or data, or may be granted privileges to take only certain actions on the computer systems.

Security and authorization mechanisms, which control access to operations or data in the computer systems, can be both direct and indirect. A computing system may conduct direct security checks of user credentials or authorization profiles (e.g., authentication identification codes (IDs) and passwords) at an attachment interface or facility (e.g., a log-in screen, at a firewall etc.)) before users can attach (i.e. gain access) to a resource (e.g., individual files or data objects, computer devices, network connections, computer programs, applications, and functionality provided by computer applications, etc.) of the computing system. The computing system's security mechanisms may include specific objects, privileges on those objects, and some privileges that provide broader authority. The computer system may also control data access indirectly with authorization checks, for example, at application bind-time or run-time.

SUMMARY

According to one general aspect, a method for access control of shared resources amongst computer systems includes generating user-authorization data formatted as data tuples on a source computer system with which a target computer system shares a resource. The source and target computer systems can have different approaches for access rights to system resources. The method further includes authorizing user access to the shared resource on the target computer system based on the user-authorization data formatted as data tuples transferred from the source computer system.

According to one general aspect, a system for generating user-authorization data formatted as data tuples on a source computer system includes a data entry generator coupled to a system user-authorization data file. The data entry generator is configured to use information in the system user-authorization data file to generate tuple data field entries in a transferable user-authorization data file. The tuple data field entries separately identify at least a user, a context, an action, and an object and object value pair.

According to one general aspect, a non-transitory computer readable medium includes instructions capable of being executed on a source computer system with which a target computer system shares a resource. The instructions when executed on the source computer system generate a transferable user-authorization data file for the shared resource using information stored in the source computer system's user-authorization data files. The transferable user-authorization data file includes a data tuple having data field entries separately identifying at least a user, a context, an action, and an object and object value pair.

The details of one or more implementations are set forth in the accompanying drawings and the description below. Other features will be apparent from the description and drawings, and from the claims.

DETAILED DESCRIPTION

Figure 1:
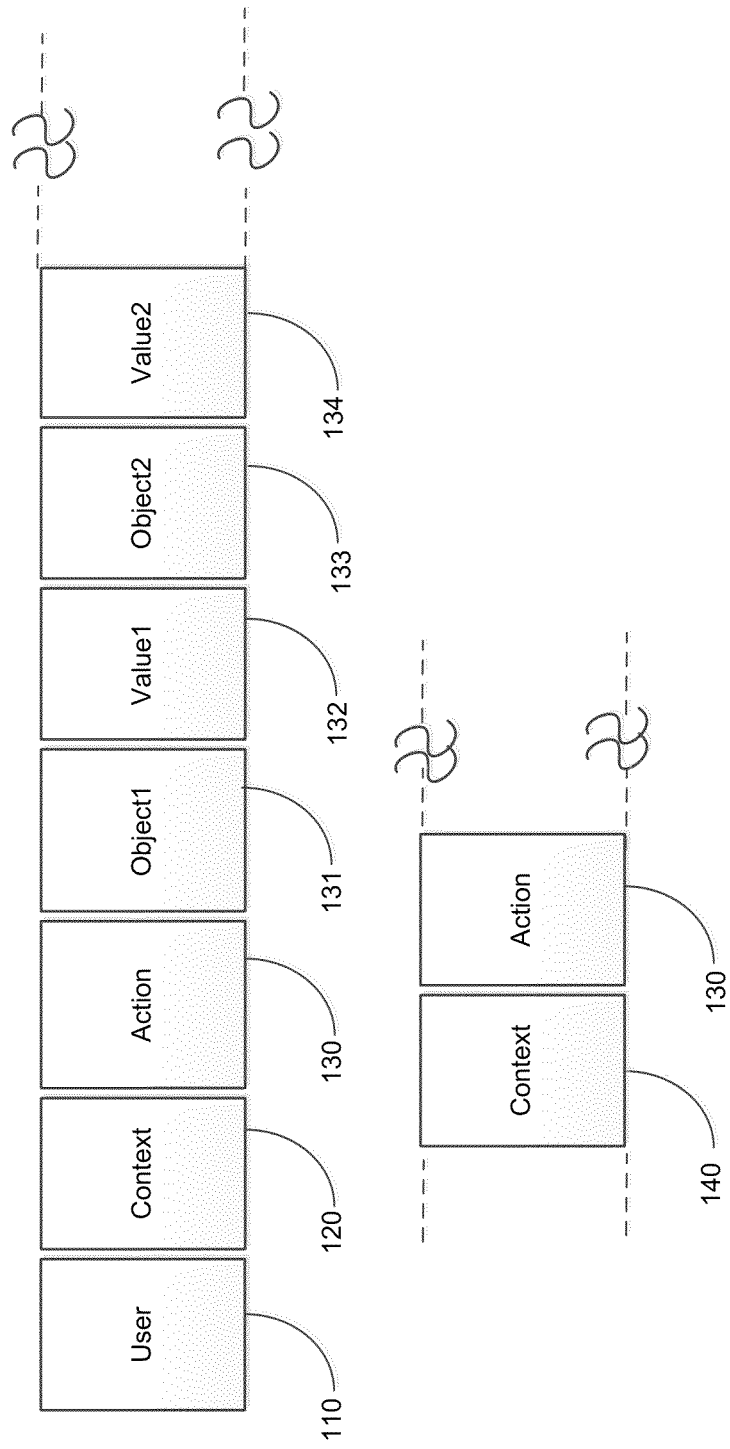
FIG. 1 is a block diagram of a transferable user-authorization data file, in accordance with principles of the disclosure herein.

A transferable user-authorization data file has a data structure or format that allows use of authorization data across computer systems having diverse system access control policies or approaches for security and authorization mechanisms, in accordance with the principles of the disclosure herein.

Example policies or approaches or approaches for security and authorization mechanisms may include a rule-based access control policy ("rule-based management"), a data-centric approach, and a code-based or application-managed authorization approach.

Rules-based management of a computer system's security and authorization mechanisms may be directed to preventing intrusions or access to a computer system by unauthorized users. The access control rules may be customized based, for example, on business requirements, to manage the needs and privileges of particular users or user types. Procedural access control rules may define the physical actions that users may have to take access computer system's resources. For example, a new user may have to complete a registration form to establish a user ID and password. Technical access control rules may define conditions for allowing or denying user actions on the computer system. In rule-based management, formal access control rules are stored in system user-authorization data files. Each time a user wants to take a particular action (e.g., read, send, or delete) the computer system may check an access control rule in the system user-authorization data files to determine if the user is authorized or privileged to take the particular action.

In the data-centric approach, a computer system's security and authorization mechanisms may be directed more toward protect data assets rather than merely preventing unauthorized access or intrusion of the computer system. The data-centric approach may involve assessing values of individual objects (e.g., pieces of information or data), and then defining specific controls and security measures for each individual object. The computer system may determine a level of needed access authorization for each object, and may maintain a list of objects and values for the corresponding levels of needed authorizations in system user-authorization data files. A particular data object (e.g., a file or record) in the computer system may have been listed or flagged as a requiring access authorization of a certain level. In operation, when a user wants to access the particular data object, the computer system may with reference to the system user-authorization data files perform an authorization check to verify if the user is authorized to access data objects having the certain level of authorization requirement.

In the code-based or application-managed authorization approach, a computer system may rely on conditions that may be coded in the application to determine whether to allow a user access to a computer resource. Unlike computer systems under the rules-based management or data centric approaches, the computer system under the application-managed approach may check on a code-based condition for access control with or without reference to any stored user-authorization data files.

For convenience in description, computer systems deploying rule-based, data-centric and application-managed approaches for access control may be referred to herein as type I, type II, and type III systems, respectively. It will be noted system user-authorization data files in type II systems may have a flat structure and system user-authorization data files in type I systems have partly flat data structure.

A configuration of security and authorization mechanisms may be specific to a computer system based on the policy or approach to access control adopted for the computer system. System user-authorization data files, which may include authentication data and access control data, also may be specific to the computer system and may have to be recreated for every different configuration of the security and authorization mechanisms on the computer system. Further, any two computer systems may share a common resource (e.g., business data, a network connection, a device, etc.) that a user may want to access or operate. For access control of the common resource, the two computer systems may have to transfer or exchange their respective system user-authorization data files, which may have disparate data formats. Information in a transferred system user-authorization data file may have to be recreated or reformatted in the local system's user-authorization data file format to allow user access of the common resource across the two systems.

FIG. 1 shows an example transferable user-authorization data file 100 that can be exchanged or transferred amongst diverse computer systems for access control of shared resources. User-authorization data file 100, which may be transferred from a source computer system to a target computer system, may be based on a data model for authorization data that is directly interpretable by diverse computer systems (including, for example, type I, II and III systems). Transferable user-authorization data file 100 may have a data structure, which may allow it to be readily transformed and stored in the target computer system's local user-authorization data file storage format. With this approach run-time authorization or access control procedures may not have to be changed in the target system.

Transferrable user-authorization data file 100 may, for example, have a flat file structure. The flat file structure may, for example, be a record-per-line form, or a table form. Data file 100 may include at least one data tuple having entries for data fields separately identifying a user, a context, an action, and one or more object-object value pairs. The data tuple may, for example, have a data field structure: "User, Context, Action, Object1, Value1, Object2, Value2, ObjectN, ValueN," where N is an integer n, n≥1. FIG. 1 shows example data tuple 100 with data fields separately identifying User 110, Context 120, Action 130, Object1 131, Value1 132, Object2 133, Value2 134, etc.

For convenience in description, data tuple fields (e.g., context, action, object, etc.) that call out or name system (or application) properties or elements may be referred to hereinafter as the "named" data fields. Tuple data fields (e.g., user, value, etc.) that carry or hold carry transient or user-specific data values may be referred to hereinafter as the "value" data fields.

The target computer system to which transferable user-authorization data file 100 may be transferred from the source computer system may control or authorize user access to a shared resource on the (target) system with reference to transferred user-authorization data file 100. The target computer system may conduct a user authorization check (e.g., at run-time) upon execution of an action on a certain object in a certain context and for a certain value of the object. For a data tuple having data field entries identifying a user, a context, an action, an object and an object value, authorizing user access to the shared resource based on the transferred user-authorization data may, for example, include conducting a user authorization check for execution of the identified action on the identified object by the identified user in the identified context for the identified object value. For example, with reference to the data fields of data tuple 100 shown in FIG. 1, a user may be allowed to create (action 130) a sales order (context 120) for a company (object 131) which is "SimpleCo" (object value 131). Further, for example, a user may be allowed to pay (action 130) an invoice (context 120) of a company (object 131) which is "SimpleCo" (object value 132) and which belongs to cost center (object 133) which is "100" (object value 134). As another example, a user may be allowed to run a query (action 130) that shows individual monthly salaries of employees (context 120) of cost center (object 133) which is "100" (object value 134). As yet another example, a user may be allowed to run a query (action 130) that shows the sum of monthly salaries of all employees (context 120) of an organizational unit (object 133) which is "100" (object value 134), but may not be allowed a query (action 130) that shows individual monthly salaries of employees (context 140) of cost center (object 133) which is "100" (object value 134).

It will be understood that while data file 100 is shown has having a flat file structure, data file 100 can have other structures or formats that are convenient for data exchange. Further, it will be understood that transferable user-authorization data file 100 is not limited to use of the particular example tuple shown in FIG. 1 (i.e. tuple: "User, Context, Action, Object, Value1, Object2, Value2, . . . ObjectN, ValueN,") to carry authorization information or data. Data file 100 may use one or more tuples having data field structures other than the structure shown in FIG. 1 to convey authorization information or data. For example, data file 100 may include a data tuple with alternate or additional data fields than shown to convey authorization data. For example, data file 100 may use a tuple having a structure: "User, Context, Action, Resource, Object, Value1, Object2, Value2, ObjectN, ValueN," where N is an integer n, n≥1. In operation, this example data tuple may be interpreted or evaluated, for example, as: User "U" is allowed to execute an action "A" on a resource "R" if Context is "C", and Object1, has Value1, and Object has Value2.

In another example, authorization or access control on a computer system may be based on user roles. Different users may be granted different access privileges on the computer system according to their respective roles (e.g., administrator, supervisor, regular employee, etc.). In such instances, authorization data file 110 may, for example, include a pair of tuples to convey data information for authorization or access control based on user roles. Data file 100 may, for example, use Tuple 1: "Role, Context, Action, Object, Value1, Object, Value2, ObjectN, ValueN" and Tuple 2: "User, Role" to convey authorization data information. In this example, the "Role" data field in Tuple 2 may identify a group of users. This identification may allow assignment of an identical set of authorization data (e.g., Tuple 1) to more than one user in the group.

In yet another example, a computer system's security and authorization mechanisms may include explicit rules or results (e.g., an explicit "deny" rule). In such instances, authorization data file 100 may, for example, use a data tuple that includes a data field for explicit result values (e.g., "Grant" or "Deny."). However, in general, authorization data file 100 may not include explicit values for all of the data fields in a tuple. One or more data fields in a tuple may carry wildcard or generic values.

A source computer system may automatically prepare transferable user-authorization data file 100 for transfer to a target computer system. The source computer system may use information stored in the system user-authorization data files to construct the tuples in data file 100.

A source computer system having rule-based management for access control (e.g., a type I system) may derive entries for the named data fields (e.g., context, action, object, etc.) in a data tuple from the system rules for access control. Further, the source computer system may use available user data to fill in user-specific values for the value data fields (e.g., user, object value, etc.) in the tuple. The number of data tuples created for data file 100 by the source computer system in this manner may be determined by the number of users and the number of "values" used.

A source computer system having a data-centric approach for access control (e.g., a type II system) may automatically prepare data file 100 by filling in data tuples from existing roles in the system's user-authorization data files. For a type II system (e.g., business intelligence system) the only allowed user action may be a "read" action. Accordingly, all tuples in data file 100 prepared by a type II source computer system may automatically list "read" in the action data field of the tuples.

A source computer system having a code-based or application-managed approach for access control (e.g., a type III system) may not store any user-authorization data files, and may require manual interaction to prepare data file 100 using information provided by code developers on the code-based authorization conditions in the system.

A source computer system (e.g., type I, type II, or type III system), which has prepared authorization data file 100 as described above, may transfer the file, for example, as an extensible markup language (XML) file to a target computer system.

Authorization data file 100 received from a source computer system by a target computer system may contain more data fields or information than may be required for access control on the target computer system. For example, a tuple in data file 100 originating from a type I system (e.g., a service-oriented transaction or business objects system) may list a "delete" action, which may not be used or available on a type II system (e.g., an analytical or business intelligence system in which only read operations can be executed by a user).

A target computer system may automatically interpret and integrate information in a received user-authorization data file 100 with its system user-authorization data files. For example, a type I target computer system may copy rule-specific parts (e.g., context, action, object 1 . . . objectN) of tuples in data file 100 into the system's user-authorization data files, and copy user-specific parts (e.g., user, roles, value1, etc.) of the tuples in to its user data files. Further, a type II system may automatically derive user roles from data file 100 by considering system-to-system context and object mapping information.

It will be understood that the transfer of user-authorization data file 100 from the source computer system to the target computer system may be preceded or accompanied by exchange of preparatory mapping information to prepare the participating systems for consistent interpretation of tuple data fields and values in user-authorization data file 100. The preparatory mapping information may include definitions or listings of tuples elements (e.g., users, roles, context, actions. etc.). The preparatory mapping information exchange may occur in one or more segments or stages via one or more routes (e.g., directly between participating systems or via a central user management solution). The preparatory mapping information exchange may include user identification and role definitions used by the participating systems. Context definitions may vary substantially from one system to another. Accordingly, the preparatory mapping information exchange may involve individual mapping of context definitions in the participating systems. A list of the context definition mappings may be predefined and stored in one or more of the participating systems. The preparatory mapping information exchange may include lists of actions (e.g., read, write, create, and delete, etc.) available on individual systems. Similarly, the preparatory mapping information exchange may include lists of authorization relevant objects and resources available on individual systems. The preparatory mapping information exchange may include a mapping of objects in different systems. Further, the preparatory mapping exchange may include an exchange of values information, which may be derived from transactional data on the systems. The values information, which may be dynamically created, may be continually updated or synchronized amongst the participating systems. A central data management solution may be deployed for this purpose. Alternatively, if the source and target computer systems are part of a networked business computer system, they may dynamically share business data containing values information relevant to authorization or access control.

Figure 2:
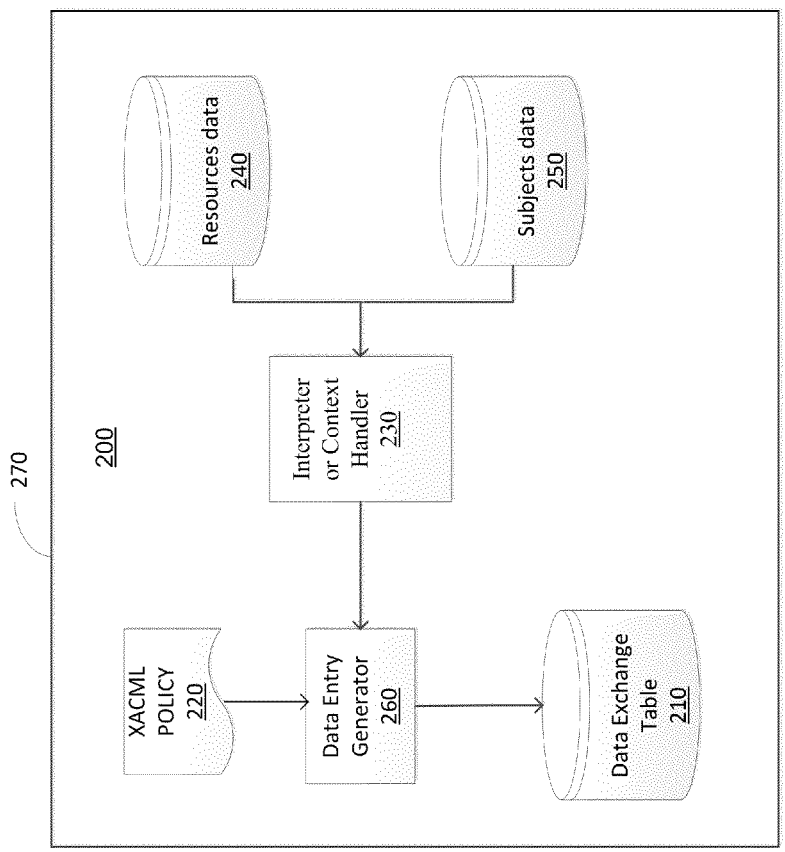
FIG. 2 is a block diagram of an arrangement for constructing an authorization data exchange table, in accordance with principles of the disclosure herein.

FIG. 2 schematically shows an example arrangement 200 that may be deployed or hosted by a source computer system (e.g., type I system 270) for creating a transferable user-authorization data file (e.g., data exchange table 210) from system user-authorization data files (e.g., XACML Policy 220, resources data 240, and users or subjects data 250). Data exchange table 210 may have tuple entries that have formats similar to the formats of tuples in data file 100 (i.e. "User, Context, Action, Resource, Object1, Value1, Object2, Value2 . . . ObjectN, ValueN").

The source computer system (e.g., type I system 270) deploying or hosting arrangement 200 may, for example, have an eXtensible Access Control Markup Language (XACML) declarative access control policy 220. XACML, a version 2.0 of which has been ratified by OASIS standards organization, is a declarative access control policy language implemented in XML and includes a processing model describing how to interpret the policy. XACML may define how to interpret authorization data in a rule-based approach. In XACML, a subject may make an access request to perform an action on a resource. XACML may use terms subject (user), resource (context), and action (object and action) in access requests. For example, in an access request, "Allow the finance manager to create files in the invoice folder on the finance server," the subject term is the "finance manager," the target resource term is the "invoice folder on the finance server," and the action term is "create files." It will be noted that XACML defines the combination of "action" and "object" as one object type. This combined object type may not exist on other computer systems. System 270 user-authorization data files, which use XACML terminology (e.g., the combined definition of action and object), may not be compatible with data models of other computer systems or system types.

With renewed reference to FIG. 2, arrangement 200 may include a data entry generator 260, which may be coupled to a system user-authorization rules file (e.g., XACML Policy 220) and system user-authorization data files resources data 240 and subject data 250 via a data interpreter (e.g., interpreter or context handler 230). Context handler 230 may be configured to interpret data in system user-authorization data files 240 and 250, for example, toward making data entries for tuples "User, Context, Action, Resource, Object1, Value1, Object2, Value2 ... ObjectN, ValueN" in data exchange table 210. Context handler 230 may, for example, interpret and parse XACML action data "create file" as separate action data (e.g., "create") and separate object data (e.g., "a file in invoice folder of finance server") for entries in corresponding action and object data fields in a tuple in data exchange table 210.

In arrangement 200, data entry generator 260 may be configured to combine data interpretations by context handler 230 with XACML Policy 220. For example, data entry generator 260 may determine which users are privileged to take an action (e.g., "create") on an object (e.g., "a file in invoice folder of finance server") with reference to XACML Policy 220. Data entry generator 260 may be further configured to make corresponding data entries to complete data exchange table 210.

System 270 may transfer data exchange table 210 to another computer system, for example, when a user application calls for access to or use of the other computer system's resources. Transfer of the data exchange table 210 to the other computer system may allow consistent access control checks on both the computer systems.

Figure 3:
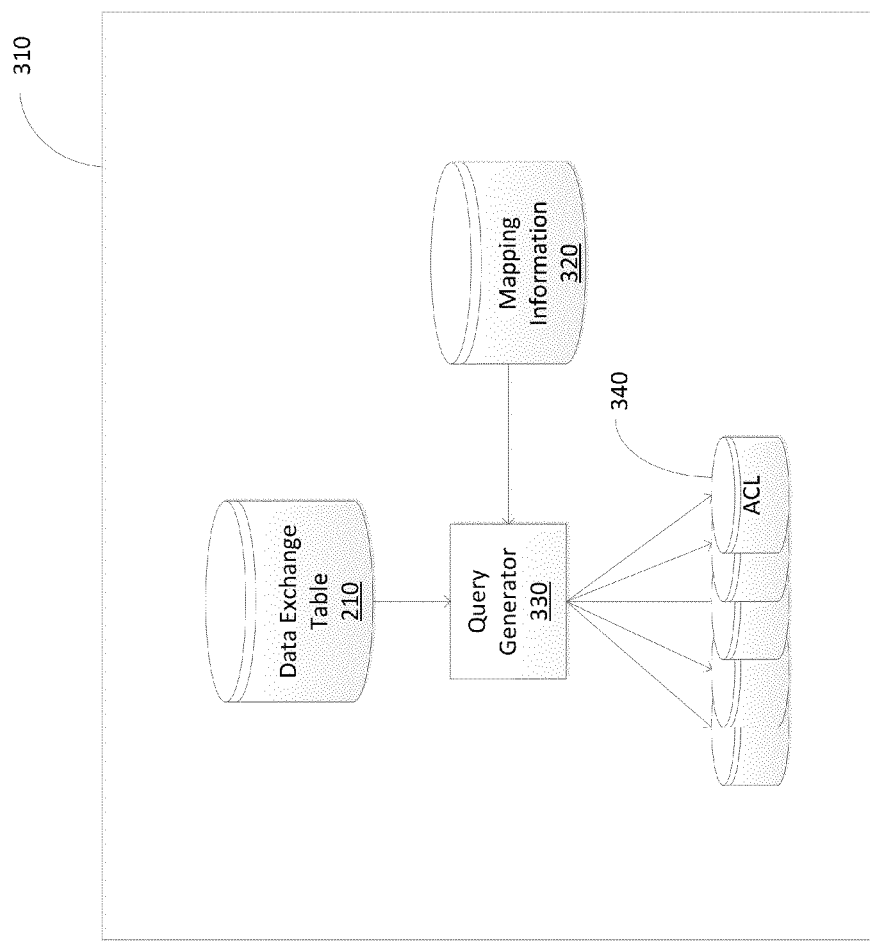
FIG. 3 is a block diagram of an arrangement for constructing access control lists by querying an authorization data exchange table, in accordance with principles of the disclosure herein.

FIG. 3 schematically shows an example arrangement 300 that may be deployed or hosted by a computer system 310 to generate access control lists (ACL) 340 from a data exchange table (data exchange table 210) that it may have received from another computer system (e.g., system 270, FIG. 2). Arrangement 300 includes a query generator 320 coupled to mapping information 320 and data exchange table 210. Mapping information 320 may include preparatory mapping information used to prepare computer system 310 for consistent interpretation of data fields and values in transferable user-authorization data files (e.g., data file 100, data exchange table 210) across diverse computer systems. The preparatory mapping information may include definitions or listings of tuples elements (e.g., users, roles, context, actions. etc.). Mapping information 320 may be dynamically updated between computer system 310 and the source system (e.g., system 270) of data exchange table 210.

In arrangement 300, query generator 320 may be configured to query data exchange table 210 to derive authorization information. Query generator 320 may, for example, be a structured query language (SQL) generator. In operation, query generator 320 may use mapping information 320 definitions to construct queries for authorization information, for example, in response to user requests for access to computer system 310 or its resources. Query generator 320 may query data exchange table 210 to find data or sets of data for ACL 340. The data or sets of data sought for ACL 340 may inform computer system 310 which permissions, or access rights, each user or group has to a specific system resource or object (e.g., a directory or file). Each system resource or object may have a unique security attribute identifying which users can have access to it. ACL 340 created by query generator 320 may be a list of objects and user access privileges (e.g., read, write or execute, etc.) that system 310 may use for access control.

Figure 4:
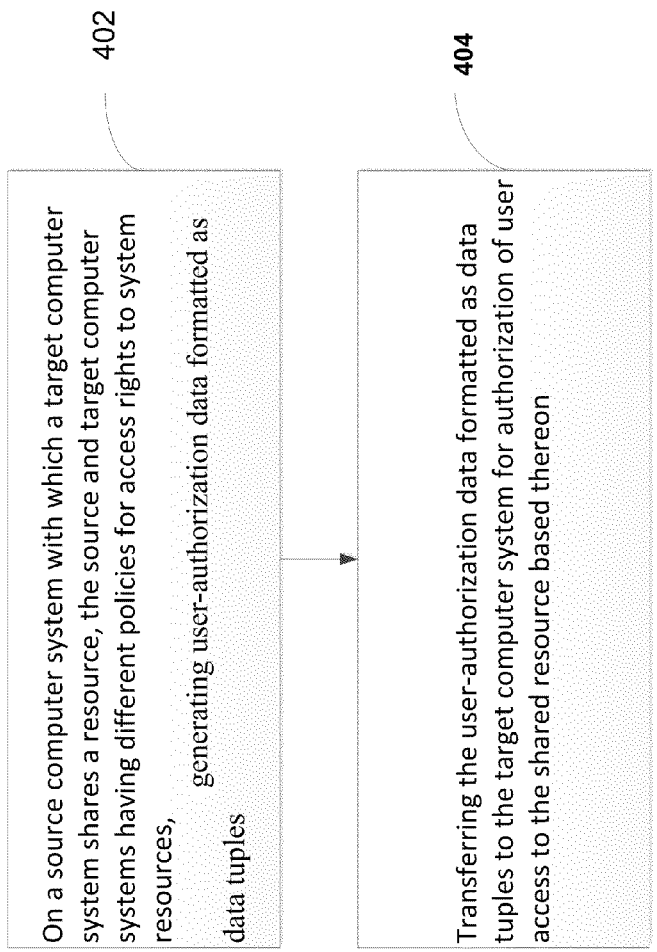
FIG. 4 is a flow diagram of a method for access control of resources shared between computer systems, in accordance with principles of the disclosure herein.

FIG. 4 shows an exemplary method 400 for access control of resources shared amongst computer systems (e.g., source computer system 270, FIG. 2 and target computer systems 310, FIG. 3) that have diverse access control policies for access rights to system resources. Method 400 includes generating user-authorization data formatted as data tuples (402) on a source computer system (e.g., system 270, FIG. 2). A target computer system (e.g., system 310, FIG. 3) may share a resource with the source computer system, but the two systems may have different policies for access rights to system resources. Method 400 further includes transferring the user-authorization data formatted as data tuples to the target computer system for authorization of user access to the shared resource thereon (404).

In method 400, generating user-authorization data formatted as data tuples 402 may include generating a data tuple having data field entries separately identifying at least a user or a user group, a context, an action, and an object and object value pair. Generating user-authorization data formatted as data tuples 402 may further include generating a data tuple having an additional data field which separately identifies a resource. If the generated data tuple identifies a user group, generating user-authorization data formatted as data tuples 402 may further include generating an additional data tuple having data field entries identifying a user and the user group.

Further, in method 400, generating user-authorization data formatted as data tuples 402 on the source computer system may include deriving data tuple field entries from information stored in system user-authorization data files. When the source computer system has system rules for access rights to resources, generating user-authorization data formatted as data tuples on the source computer system 402 may include automatically deriving one or more data tuple field entries from the system rules for access rights to resources. When the source computer system has a data-centric approach for access rights to resources and the only user action allowed is a read action, generating user-authorization data formatted as data tuples on the source computer system 402 may include automatically entering "read" as data for all action data fields in the data tuples.

In method 400, transferring the user-authorization data formatted as data tuples to the target computer system 404 may include transferring the user-authorization data, for example, as an extensible markup language (XML) file. On the target computer system, information in the transferred user-authorization data may be automatically interpreted and integrated with a system user-authorization data file. Further, authorizing user access to the shared resource based on the transferred user-authorization data may include conducting a user authorization check for execution of an action on an object by a user in a context for an object value, which may be identified by respective data field entries in a data tuple. Authorizing user access to the shared resource based on the transferred user-authorization data formatted as data tuples includes running a query on the transferred user-authorization data to derive an access control list on the target computer.

Method 400 may include exchanging mapping information between the source computer system and the target computer system. The mapping information may include mapping of system definitions of data fields in the transferred user-authorization data formatted as data tuples.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method, comprising:
   on a source computer system with which a target computer system shares a resource, the source and target computer systems having different policies for access rights of a user-entity to the shared resource,
   generating user-authorization data formatted as data tuples by deriving data tuple field entries from information stored in system user-authorization data files; and
   transferring the user-authorization data formatted as data tuples to the target computer system for authorizing the user-entity's access to the shared resource on the target computer system based on the transferred user-authorization data,
   wherein generating user-authorization data formatted as data tuples includes generating a data tuple having data field entries separately identifying at least each of the user-entity, a context, an action, and an object and object value pair.

2. The method of claim 1, wherein authorizing the user-entity's access to the shared resource on the target computer system based on the transferred user-authorization data includes conducting a user authorization check for execution of the identified action on the identified object by the identified user in the identified context for the identified object value.

3. The method of claim 1, wherein generating user-authorization data formatted as data tuples includes generating a first data tuple having data field entries identifying a user and a user group, and a second data tuple having data field entries separately identifying at least a user group, a context, an action, and an object and object value pair.

4. The method of claim 1, wherein the source computer system has system rules for access rights to resources, and wherein generating user-authorization data formatted as data tuples on the source computer system includes automatically deriving one or more data tuple field entries from the system rules for access rights to resources.

5. The method of claim 1, wherein the source computer system has a data-centric approach for access rights to resources and the only user action allowed is a read action, and wherein generating user-authorization data formatted as data tuples on the source computer system includes automatically entering "read" as data for all action data fields in the data tuples.

6. The method of claim 1, wherein transferring the user-authorization data formatted as data tuples to the target computer system includes transferring the user-authorization data as an extensible markup language (XML) file.

7. The method of claim 1, further comprising, exchanging mapping information between the source computer system and the target computer system, wherein the mapping information includes mapping of system definitions of data fields in the transferred user-authorization data formatted as data tuples.

8. The method of claim 1, further comprising, automatically interpreting and integrating information in the transferred user-authorization data with a system user-authorization data file on the target computer system.

9. The method of claim 1, wherein authorizing user access to the shared resource based on the transferred user-authorization data formatted as data tuples includes running a query on the transferred user-authorization data to derive an access control list on the target computer.

10. A system, comprising:
a source computer system including a processor coupled to a memory, the source computer system sharing a resource with a target computer system, the source and target computer systems having different policies for access rights of a user-entity to the shared resource; and
a data entry generator hosted on the source computer system and coupled a system user-authorization data file,
wherein the data entry generator is configured to use information stored in the system user-authorization data file to generate tuple data field entries in a transferable user-authorization data file, the tuple data field entries separately identifying at least each of the user-entity, a context, an action, and an object and object value pair, and
wherein the source computer system is configured to transfer the transferable user-authorization data file with the generated tuple data field entries to the target computer system for authorizing the user-entity's access to the shared resource on the target computer system.

11. The system of claim 10, wherein the data entry generator is coupled to a system user-authorization rules file and to use rules information therein to generate one or more of the tuple data field entries.

12. The system of claim 10, wherein the data entry generator is coupled to a data interpreter that is configured to interpret user and resource data in the system user-authorization data file for the data entry generator toward making the tuple data field entries.

13. The system of claim 10, further comprising, a query generator hosted on a target computer system which shares a resource with the source computer system, wherein the query generator is configured to query the transferable user-authorization data file to generate access control information for the shared resource on the target computer system.

14. A non-transitory computer readable medium, comprising:
instructions capable of being executed on a source computer system with which a target computer system shares a resource, the source and target computer systems having different policies for access rights of a user-entity to the shared resource,
which instructions when executed on the source computer system generate tuple data field entries in a transferable user-authorization data file for the shared resource using information stored in the source computer system's user-authorization data files, the tuple data field entries separately identifying at least each of the user-entity, a context, an action, and an object and object value pair, and
which instructions when further executed on the source computer system transfer the transferable user-authorization data file with the generated tuple data field entries to the target computer system for authorizing the user-entity's access to the shared resource on the target computer system.

15. The medium of claim 14, wherein the instructions when executed on the source computer system transfer the user-authorization data file for the shared resource to the target computer system.

* * * * *